US012409659B2

(12) United States Patent
Matsumoto

(10) Patent No.: US 12,409,659 B2
(45) Date of Patent: Sep. 9, 2025

(54) MAINTENANCE METHOD AND LIQUID DISCHARGE APPARATUS

(71) Applicant: Hiroyoshi Matsumoto, Kanagawa (JP)

(72) Inventor: Hiroyoshi Matsumoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/518,630

(22) Filed: Nov. 24, 2023

(65) Prior Publication Data

US 2024/0173978 A1 May 30, 2024

(30) Foreign Application Priority Data

Nov. 25, 2022 (JP) ................................ 2022-188461

(51) Int. Cl.
*B41J 2/16* (2006.01)
*B41J 2/045* (2006.01)
*B41J 2/165* (2006.01)

(52) U.S. Cl.
CPC ......... *B41J 2/1652* (2013.01); *B41J 2/04501* (2013.01); *B41J 2002/16582* (2013.01)

(58) Field of Classification Search
CPC .. B41J 2/1652; B41J 2/16526; B41J 2/16508; B41J 2/01; B41J 2/04501; B41J 2002/16582; B41J 2/1742; B41J 2/2114; B41J 2/14; B41J 2/14008; B41J 2/14016; B41J 2/14201; B41J 2/14314
See application file for complete search history.

(56) References Cited

U.S. PATENT DOCUMENTS

| | | | |
|---|---|---|---|
| 2010/0214353 A1 | 8/2010 | Sato et al. |
| 2014/0078212 A1 | 3/2014 | Nakai et al. |
| 2015/0035918 A1 | 2/2015 | Matsumoto et al. |
| 2015/0077458 A1 | 3/2015 | Osanai et al. |
| 2015/0251453 A1 | 9/2015 | Nakai et al. |
| 2015/0258814 A1 | 9/2015 | Matsumoto et al. |

(Continued)

FOREIGN PATENT DOCUMENTS

| | | |
|---|---|---|
| JP | 2015-081259 A | 4/2015 |
| JP | 2020-049833 A | 4/2020 |

OTHER PUBLICATIONS

Extended European Search Report issued Mar. 26, 2024 in European Patent Application No. 23209689.1, 8 pages.

*Primary Examiner* — Kristal Feggins
(74) *Attorney, Agent, or Firm* — XSENSUS LLP

(57) ABSTRACT

A maintenance method and a liquid discharge apparatus. The maintenance method is performed by a liquid discharge apparatus including a first liquid discharge head to discharge ink, a second liquid discharge head to discharge pretreatment liquid, and a liquid receiver into which the ink and the pretreatment liquid are discharged, and the maintenance method includes flushing the ink and the pretreatment liquid into the liquid receiver, the flushing including discharging the ink into the liquid receiver and then discharging the pretreatment liquid into the liquid receiver. The liquid discharge apparatus includes the first liquid discharge head, the second liquid discharge head, the liquid receiver, and a controller to control the first liquid discharge head and the second liquid discharge head to discharge the pretreatment liquid onto a print medium and then discharge the ink onto the print medium.

10 Claims, 4 Drawing Sheets

(56) References Cited

U.S. PATENT DOCUMENTS

| | | | | |
|---|---|---|---|---|
| 2016/0009107 | A1 | 1/2016 | Nakai et al. | |
| 2016/0159108 | A1 | 6/2016 | Matsumoto et al. | |
| 2016/0167402 | A1 | 6/2016 | Nakai et al. | |
| 2016/0214403 | A1 | 7/2016 | Matsumoto et al. | |
| 2016/0229199 | A1 | 8/2016 | Nakai et al. | |
| 2017/0001453 | A1 | 1/2017 | Ohshima et al. | |
| 2017/0182799 | A1 | 6/2017 | Nakai et al. | |
| 2017/0320349 | A1 | 11/2017 | Matsumoto et al. | |
| 2018/0126751 | A1 | 5/2018 | Nakai et al. | |
| 2020/0101767 | A1 | 4/2020 | Kobashi et al. | |
| 2020/0230961 | A1* | 7/2020 | Yoshida | B41J 2/17509 |
| 2022/0134756 | A1* | 5/2022 | Kawatani | B41J 2/16508<br>347/22 |
| 2022/0325470 | A1* | 10/2022 | Bas Ferrer | D06P 5/30 |
| 2023/0202180 | A1 | 6/2023 | Matsumoto et al. | |
| 2023/0294434 | A1 | 9/2023 | Matsumoto | |

* cited by examiner

MAINTENANCE METHOD AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-188461, filed on Nov. 25, 2022, in the Japan Patent Office, the entire disclosure of which is hereby incorporated by reference herein.

BACKGROUND

Technical Field

Embodiments of the present disclosure relate to a maintenance method and a liquid discharge apparatus.

Background Art

With regard to a liquid discharge apparatus such as an inkjet printer, there is known a technique for performing maintenance for the purpose of, for example, preventing the clogging of a nozzle or recovering ink discharging performance of the nozzle.

For example, a flushing operation of preliminarily discharging ink from a nozzle to a cap, a suction operation of capping a head with the cap and sucking thickened ink and adhering substances, and a wiping operation of wiping a nozzle forming surface of the head have been proposed.

Forming a white base after causing pretreatment liquid to adhere to a print medium by means of, for example, a roll coater or a liquid discharge head so as to enhance the concealability and color developability of the white base has been proposed. However, when the pretreatment liquid is discharged by the liquid discharge head, clogging occurs in the nozzle due to, for example, drying since the pretreatment liquid contains a coagulant. When maintenance is performed for the pretreatment liquid as with the ink, the coagulant contained in the pretreatment liquid may adhere to and clog the nozzles for discharging the ink.

SUMMARY

Embodiments of the present disclosure described herein provide a maintenance method and a liquid discharge apparatus. The maintenance method is performed by a liquid discharge apparatus including a first liquid discharge head to discharge ink, a second liquid discharge head to discharge pretreatment liquid, and a liquid receiver into which the ink and the pretreatment liquid are discharged, and the maintenance method includes flushing the ink and the pretreatment liquid into the liquid receiver, the flushing including discharging the ink into the liquid receiver and then discharging the pretreatment liquid into the liquid receiver. The liquid discharge apparatus includes the first liquid discharge head, the second liquid discharge head, the liquid receiver, and a controller to control the first liquid discharge head and the second liquid discharge head to discharge the pretreatment liquid onto a print medium and then discharge the ink onto the print medium. The controller controls the first liquid discharge head and the second liquid discharge head to discharge the ink into the liquid receiver and then discharge the pretreatment liquid into the liquid receiver.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
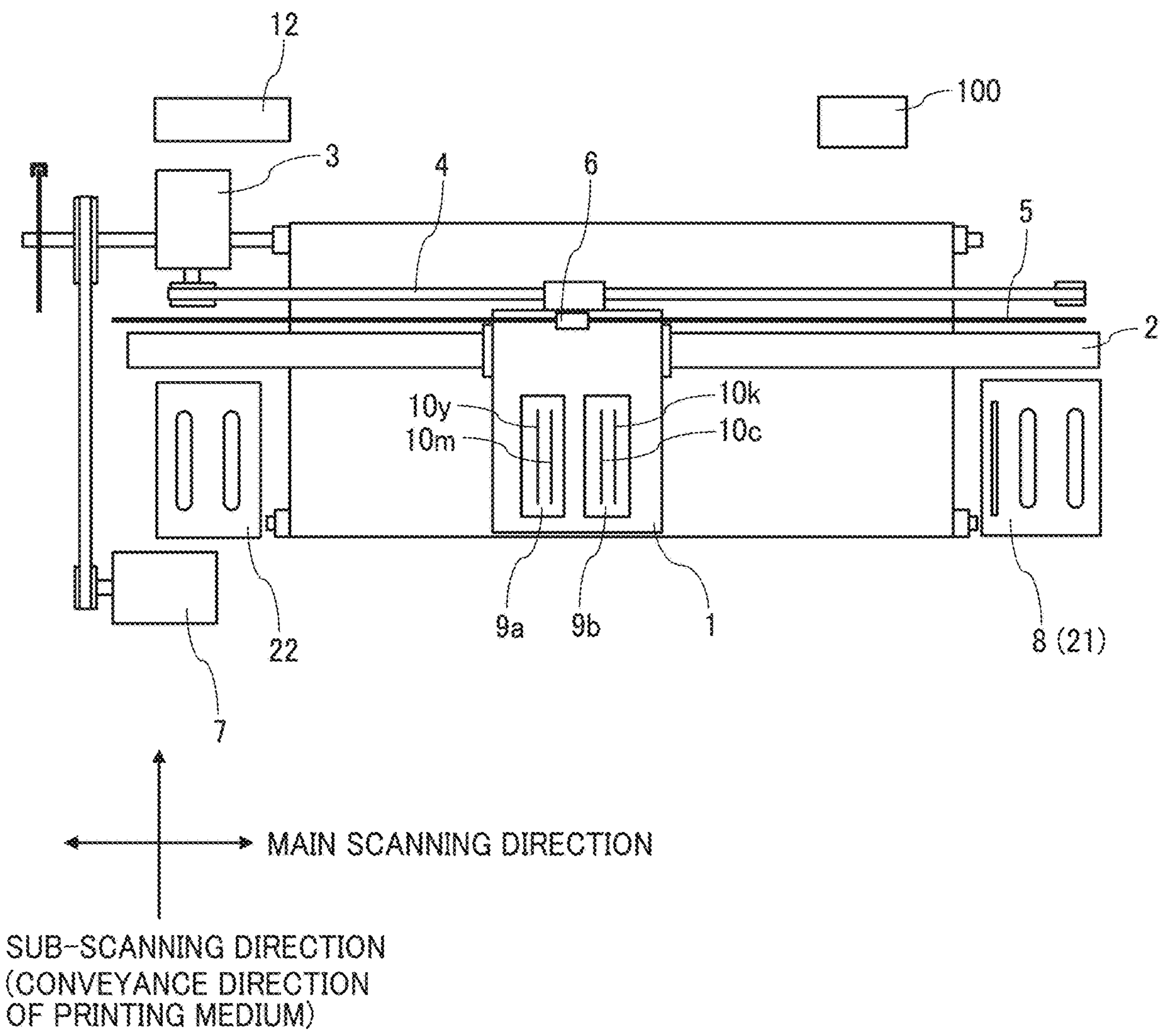
FIG. 1 is a schematic plan view of a liquid discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms “a”. “an”, and “the” are intended to include the plural forms as well, unless the context clearly indicates otherwise. It will be further understood that the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

A maintenance method and a liquid discharge apparatus according to embodiments of the present disclosure are described below with reference to the drawings. Embodiments of the present disclosure are described below, but the present disclosure is not limited to those embodiments and various applications and modifications may be made without departing from the scope of the disclosure.

A maintenance method according to embodiments of the present disclosure is to be performed by a liquid discharge apparatus including a first liquid discharge head to discharge ink, a second liquid discharge head to discharge pretreatment liquid, and a liquid receiver into which the ink and the pretreatment liquid are discharged, and the maintenance method includes flushing or dummy discharge to discharge the ink and the pretreatment liquid into the liquid receiver, the flushing or dummy discharge including discharging the ink into the liquid receiver and then discharging the pretreatment liquid into the liquid receiver.

A liquid discharge apparatus according to embodiments of the present disclosure includes a first liquid discharge head to discharge ink, a second liquid discharge head to discharge pretreatment liquid, a liquid receiver into which the ink and the pretreatment liquid are discharged, and a controller to control the first liquid discharge head and the second liquid discharge head. The controller controls the first liquid discharge head and the second liquid discharge head to discharge the pretreatment liquid onto a print medium and then discharge the ink onto the print medium, and the controller controls the first liquid discharge head and the second liquid discharge head to discharge the ink into the liquid receiver and then discharge the pretreatment liquid into the liquid receiver.

FIG. 1 is a schematic plan view of a liquid discharge apparatus according to an embodiment of the present disclosure, illustrating a basic configuration of the liquid discharge apparatus.

FIG. 1 is a schematic plan view of the liquid discharge apparatus that performs a maintenance method according to an embodiment of the present disclosure, which illustrates an embodiment of the liquid discharge apparatus. However, the illustration and description of the pretreatment liquid are omitted from FIG. 1.

The liquid discharge apparatus may be referred to as, for example, an apparatus for discharging liquid. Examples of the liquid discharge apparatus include an image forming apparatus, a printing apparatus, a recording apparatus, a printer, and an inkjet printer.

A carriage 1 is held by a guide rod 2, and is scanned in a main scanning direction by the driving of a main-scanning motor 3 via a pulley 4 lying between the carriage 1 and the main-scanning motor 3. The carriage 1 has recording heads 9*a* and 9*b* mounted thereon. The recording heads 9*a* and 9*b* discharge ink droplets of colors such as yellow (Y), cyan (C), magenta (M), and black (K).

The main scanning direction and a sub-scanning direction are indicated by arrows in the drawing. The direction of scanning to be performed by the carriage is defined as the main scanning direction, and a direction orthogonal to the main scanning direction is defined as the sub-scanning direction. A print medium is conveyed in the sub-scanning direction.

The recording heads 9*a* and 9*b* are such that ink of the above-described colors can be independently discharged from rows of nozzles 10*y*, 10*m*, 10*c*, and 10*k* in each of which a plurality of ink discharge nozzles is arrayed in a single direction for corresponding one of the colors. The recording head 9*a* includes the rows of nozzles 10*y* and 10*m*, and the recording head 9*b* includes the rows of nozzles 10*c* and 10*k*. Examples of the array direction of the nozzles include the sub-scanning direction as illustrated in the drawing. The array direction of the nozzles is not limited thereto, and the nozzles may be arrayed at a certain angle with respect to the sub-scanning direction.

The recording heads 9*a* and 9*b* according to the present embodiment serve as a pair of first liquid discharge heads that discharge ink. The ink discharged by the first liquid discharge head may be referred to as, for example, printing ink and image forming ink. In the present example, yellow (Y) ink, cyan (C) ink, magenta (M) ink, and black (K) ink are used as the ink, but the ink is not limited thereto, and can be appropriately changed. For example, a single type of ink may be used.

The first liquid discharge head may include a plurality of liquid discharge heads. Thus, the recording heads 9*a* and 9*b* may each serve as the first liquid discharge head according to the present embodiment. A single liquid discharge head may be provided for each type of ink.

The pretreatment liquid will be described below. A second liquid discharge head that discharges the pretreatment liquid may be provided for the carriage 1 on which the first liquid discharge head is mounted, or may be provided for a carriage different from the carriage 1.

The position data of the carriage 1 can be obtained by use of, for example, an encoder sensor 6 secured to the carriage 1. While moving together with the carriage 1, the encoder sensor 6 reads patterns recorded at regular intervals on an encoder sheet 5 secured to an apparatus housing. For example, a controller 100 can calculate the position data of the carriage 1 by adding/subtracting the count of the encoder sensor 6.

At the time of image formation, the carriage 1 is caused to move (perform scanning) in the main scanning direction while the position data of the carriage 1 is obtained by the encoder sensor 6, and ink droplets are discharged onto a recording medium at necessary positions. At this time, it is possible to form an image on a band having a width equal to the length of the rows of nozzles by performing ink discharging operation once while moving the carriage 1 in the main scanning direction. When image formation for a single band is completed, a sub-scanning motor 7 is driven to move the recording medium in the sub-scanning direction, and the image forming operation is performed again for another single band. It is possible to form an image at any desired position on the recording medium by repeating these steps.

In an inkjet recording apparatus performing printing, there are many heat sources such as a driving signal generation circuit of an ink discharge actuator and a motor. In order to handle such a situation, a cooling fan 12 is installed as necessary for managing the temperatures of various devices and the internal temperature of the inkjet recording apparatus. For example, an exhaust unit may be provided which includes an intake duct having an intake port inside the apparatus, and an exhaust device (for example, cooling fan 12) communicating with the intake duct.

When not discharged for a certain period of time, ink on the nozzle surface of the recording head is thickened. This causes deterioration of discharging characteristics and difficulty in discharging ink, resulting in deterioration of print quality. For this reason, when a certain period of time has elapsed since the previous print job, a maintenance mechanism 8 performs maintenance of the nozzle surface by, for example, flushing or dummy discharge in which thickened ink is discharged and wiping with a blade. By so doing, ink discharging characteristics are maintained.

The maintenance mechanism 8 includes a liquid receiver into which ink is discharged as flushing or dummy discharge is performed. The term “flushing or dummy discharge” indicates discharging the ink that has no influence on printing. The maintenance mechanism 8 has a liquid receiver 21. Reference sign 8 (21) in FIG. 1 indicates that the maintenance mechanism 8 includes the liquid receiver 21.

The liquid discharge apparatus according to the present embodiment may include a plurality of liquid receivers. In the present embodiment described with reference to FIG. 1, the liquid receiver 22 is arranged on the left side of the drawing. In order to distinguish a pair of liquid receivers in the following description, those liquid receivers are referred to as a first liquid receiver 21 and a second liquid receiver 22.

Depending on the chart to be printed, there is a nozzle that does not perform ink droplet discharge for a long time even during printing. As a result, the ink discharging characteristics of such a nozzle may deteriorate. In order to recover the ink discharging characteristics even during printing or between printing, for example, the carriage 1 may be caused to perform scanning and move onto the second liquid receiver 22 to discharge droplets of a certain amount of ink from the nozzles of the recording heads. Thus, the discharging characteristics of the ink and the pretreatment liquid can be more favorably maintained.

In the present example, the first liquid receiver 21 and the second liquid receiver 22 are used for different purposes. For example, in a case where printing is not performed for a long period of time, flushing or dummy discharge is performed on the first liquid receiver 21 based on the assumption that the degree of thickening will increase in such a case. In this case, since maintenance such as wiping may also be performed, it is also possible to perform other maintenance without causing the carriage 1 to perform scanning. The maintenance mechanism 8 may include a cap, and each liquid discharge head may be capped with the cap so as to prevent drying. In a case where printing is not performed for a long period of time after completion of capping, flushing or dummy discharge is performed on the first liquid receiver 21. As a result, movement of the carriage 1 can be reduced, so that maintenance can be efficiently performed.

Meanwhile, no capping or wiping is performed, and only flushing or dummy discharge is performed on the second liquid receiver 22. In the present example, flushing or dummy discharge is performed on the second liquid receiver 22 so as to recover the ink discharging characteristics even during printing or between printing. With such a configuration, maintenance can be more easily performed, and the discharging characteristics of the ink and the pretreatment liquid can be more favorably maintained.

The controller 100 includes, for example, a central processing unit (CPU), a read-only memory (ROM), a random access memory (RAM), a hard disk drive (HDD), a solid state drive (SSD), and an interface (I/F). The controller 100 controls, for example, liquid discharge from the first liquid discharge head and the second liquid discharge head. In addition, the controller 100 controls, for example, scanning to be performed by the carriage 1, and conveyance of the print medium.

The discharge of the pretreatment liquid is described below with some concrete examples.

Figure 2:
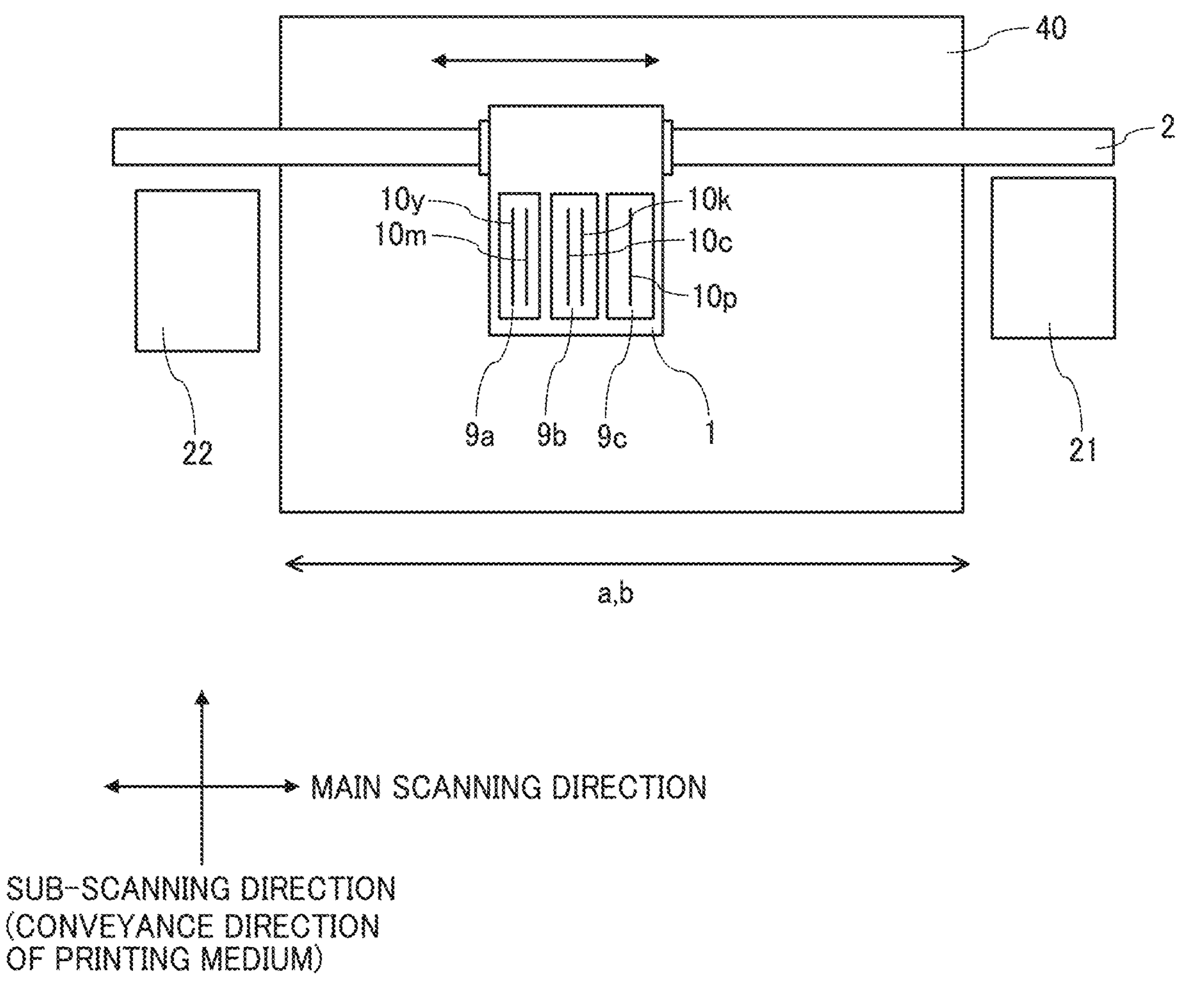
FIG. 2 is a schematic view of a liquid discharge apparatus according to an embodiment of the present disclosure.

FIG. 2 is a schematic view of the liquid discharge apparatus according to the present embodiment.

The present example corresponds to an example of a case where the second liquid discharge head is mounted on the carriage 1 in the present embodiment described with reference to FIG. 1.

As illustrated in the drawing, the carriage 1 has a recording head 9*c* mounted thereon. The recording head 9*c* corresponds to the second liquid discharge head. The recording head 9*c* includes rows of nozzles 10*p*. Pretreatment liquid is discharged from the nozzles of rows of nozzles 10*p*. The second liquid discharge head may include a plurality of liquid discharge heads, and may discharge multiple types of pretreatment liquid.

In a printing step according to the present embodiment, the carriage 1 performs two-way scanning in the main scanning direction, the second liquid discharge head discharges pretreatment liquid onto a print medium 40, and the first liquid discharge head discharges ink onto the print medium 40 to which the pretreatment liquid has been applied.

The flushing or dummy discharge in the maintenance method of the present example is performed on the first liquid receiver 21 or the second liquid receiver 22. When the flushing or dummy discharge is performed, the carriage 1 moves to the position of the first liquid receiver 21 or the second liquid receiver 22 to cause the recording heads 9*a*, 9*b*, and 9*c* to perform flushing or dummy discharge.

The maintenance method according to the present embodiment may include a wiping step, and a capping step as described above, in addition to the flushing or dummy discharge. The maintenance method may be referred to as, for example, a maintenance step.

Figure 3:
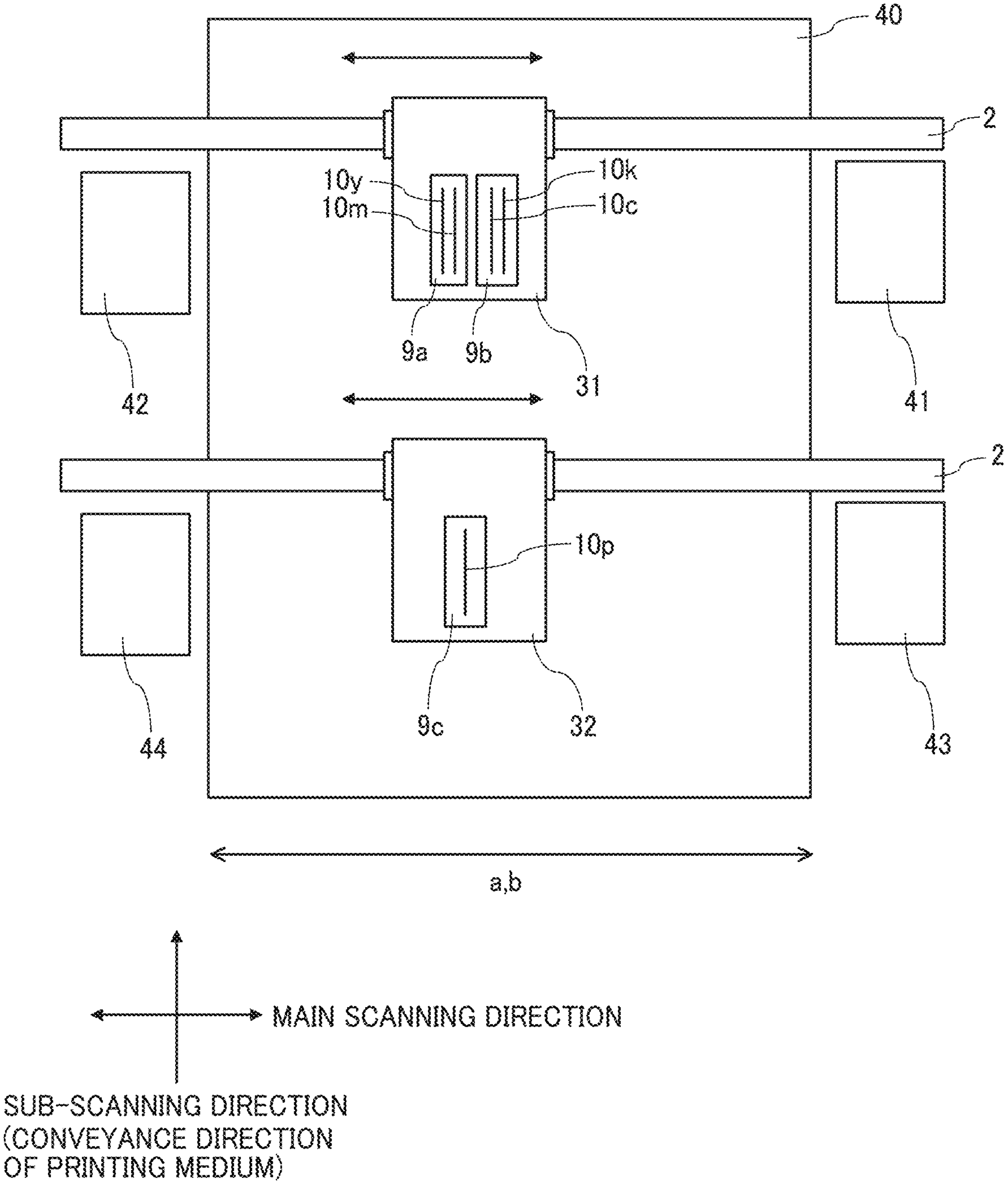
FIG. 3 is a schematic view of a pair of liquid discharge apparatuses according to an alternative embodiment of the present disclosure.

FIG. 3 is a schematic view of a pair of liquid discharge apparatuses according to an alternative embodiment of the present disclosure.

The present example corresponds to an example of a case where there are provided a first carriage on which the first liquid discharge head is mounted and a second carriage on which the second liquid discharge head is mounted.

The liquid discharge apparatus of the present example includes a first carriage 31 and a second carriage 32. The first carriage 31 has the recording heads 9*a* and 9*b* (first liquid discharge heads) mounted thereon. The second carriage 32 has the recording head 9*c* (second liquid discharge head) mounted thereon. The second carriage 32 performs two-way scanning in an area upstream from the first carriage 31 in the conveyance direction of the print medium. Also in the printing step according to the present embodiment, the second liquid discharge head discharges pretreatment liquid onto the print medium 40, and the first liquid discharge head discharges ink onto the print medium 40 to which the pretreatment liquid has been applied.

For example, the pretreatment liquid is applied to the print medium, which is also referred to as a recording medium or a medium, before the ink is discharged for the purpose of increasing the image density by coagulation of ink. The pretreatment liquid contains, for example, water, an organic solvent, and a coagulant, and also contains, for example, a surfactant as necessary. Examples of the coagulant include polyvalent metal salts and cationic polymers.

When a fabric is used as the print medium, discharge of the pretreatment liquid contributes preferably in particular. It is possible to prevent the permeation of ink into the fabric by discharging the ink after discharging pretreatment liquid onto the fabric. The fixation of the ink can be enhanced by discharging the pretreatment liquid onto the fabric. In the liquid discharge apparatus according to the present embodiment, the second liquid discharge head discharges pretreatment liquid onto a print medium, and the first liquid discharge head discharges ink onto the print medium onto which the pretreatment liquid has been discharged.

An area where the pretreatment liquid is discharged can be appropriately selected. The pretreatment liquid may be discharged onto the entire surface of the print medium. Alternatively, the area where the pretreatment liquid is discharged may be appropriately selected according to the area where the ink is discharged.

In the present embodiment, when the printing step is performed, the pretreatment liquid is discharged onto the print medium, and then the ink is discharged. The use of the pretreatment liquid offers advantages in that permeation of the ink into the print medium can be prevented and the fixing of the ink can be enhanced. As described above, such advantages are considered particularly desired when the print medium is fabric.

In one of the techniques, pretreatment liquid is applied to a print medium by use of a roll coater and then, a white base is formed. However, in this case, it takes time and effort to perform pretreatment, and good productivity cannot be obtained. Meanwhile, the liquid discharge apparatus according to the present embodiment discharges pretreatment liquid and ink. In other words, the liquid discharge apparatus according to the present embodiment can discharge the pretreatment liquid and discharge the ink. As a result, the liquid discharge apparatus according to the present embodiment can increase productivity.

Furthermore, one of the techniques causes pretreatment liquid and ink to adhere to a print medium by an inkjet method. However, since the pretreatment liquid contains a coagulant, clogging occurs in nozzles due to, for example, drying. In general, it is also necessary for a liquid discharge head that discharges pretreatment liquid to perform liquid discharge for nozzle maintenance while a printing step is not being performed. However, maintenance of the pretreatment liquid has not been sufficiently considered in the technique. When maintenance is performed for the pretreatment liquid as with the ink, the coagulant may adhere to and clog the nozzles for discharging the ink.

For example, when flushing or dummy discharge of the pretreatment liquid is performed, the pretreatment liquid floats as mist and flies in the apparatus. The mist of the pretreatment liquid moves in the apparatus, reaches a liquid discharge head that discharges ink, and affects the flushing or dummy discharge of the ink. Even if the first liquid discharge head that discharges the ink and the second liquid discharge head that discharges the pretreatment liquid are mounted on separate carriages, the mist of the pretreatment liquid can reach the first liquid discharge head that discharges the ink.

In order to handle such a situation, when maintenance is performed in the present embodiment, pretreatment liquid is discharged into the liquid receiver after the ink is discharged into the liquid receiver. In other words, the maintenance method according to the present embodiment includes flushing or dummy discharge in which the ink and pretreatment liquid are discharged into the liquid receiver, and the flushing or dummy discharge includes discharging the pretreatment liquid into the liquid receiver after discharging the ink into the liquid receiver.

Furthermore, in the liquid discharge apparatus according to the present embodiment, the controller 100 controls the first liquid discharge head and the second liquid discharge head in such a way as to cause the first liquid discharge head and the second liquid discharge head to perform a printing process of discharging the ink and the pretreatment liquid onto the print medium to perform printing and a flushing or dummy discharge process of discharging the ink and the pretreatment liquid into the liquid receiver. The flushing or dummy discharge process includes discharging the pretreatment liquid into the liquid receiver after discharging the ink into the liquid receiver.

According to the present embodiment, it is possible to prevent deterioration of pretreatment liquid discharging performance by performing maintenance of pretreatment liquid in a liquid discharge apparatus that discharges the pretreatment liquid and ink, so that at the time of maintenance, it is possible to reduce an influence of the pretreatment liquid on nozzles for discharging the ink.

In the flushing or dummy discharge in the present embodiment, pretreatment liquid is discharged into the liquid receiver after the ink is discharged into the liquid receiver. Discharging the ink first makes it possible to discharge thickened ink (flushing or dummy discharge) before the pretreatment liquid floats in a system. For example, when a space is formed between the nozzle surface and the liquid receiver, the pretreatment liquid may float in the space. In such a case, it is possible to reduce the influence of the floating pretreatment liquid on the flushing or dummy discharge of ink. When flushing or dummy discharge of ink is performed first, a reaction between the ink and the pretreatment liquid can be avoided at the time of maintenance.

Meanwhile, if the pretreatment liquid is discharged before the discharge of the ink in the flushing or dummy discharge, there is a possibility that maintenance cannot be sufficiently performed for the nozzles for discharging the ink. When space is formed between the nozzle surface and the liquid receiver, the pretreatment liquid floats in the space, and the floating pretreatment liquid affects the nozzles for discharging the ink. For example, before flushing or dummy discharge of thickened ink is performed, ink near nozzles is coagulated by the floating pretreatment liquid. Thus, the thickened ink and the coagulated ink cannot be sufficiently discharged in some cases. For this reason, maintenance of the nozzles for discharging the ink cannot be sufficiently performed, and thus, the nozzles for discharging the ink are clogged. As a result, ink discharging performance is deteriorated, so that a good image cannot be obtained.

If the pretreatment liquid is discharged before the discharge of the ink in the flushing or dummy discharge, the pretreatment liquid floats as a mist in the system, and then reacts with ink discharged as flushing or dummy discharge to affect nozzles or nozzle surfaces from which the ink is discharged. For example, if ink in a mist state adheres to a nozzle or a nozzle surface and then, the pretreatment liquid further adheres thereto, adhering ink is generated. In addition, for example, when ink is discharged as flushing or dummy discharge in a state where the pretreatment liquid is floating in the system, the pretreatment liquid and the ink react with each other to cause stains in the system (for example, in the apparatus) and stains such as adhering ink on the nozzle surface and the maintenance mechanism 8.

When the pretreatment liquid and the ink are simultaneously discharged in the flushing or dummy discharge, the coagulant contained in the pretreatment liquid adheres to the nozzles for discharging the ink. For this reason, the nozzles for discharging the ink are clogged. As a result, ink discharging performance deteriorates and thus, a good image cannot be obtained.

Figure 4:
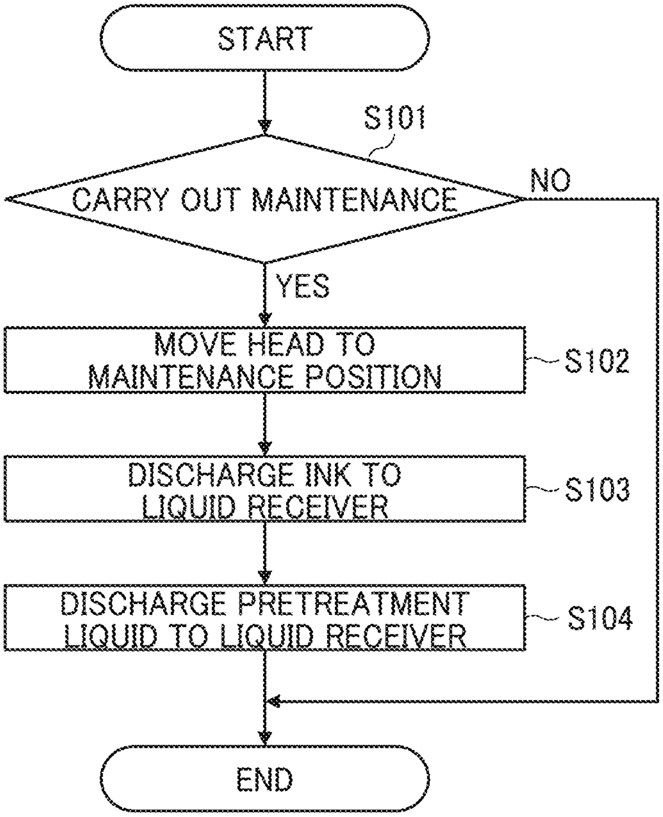
FIG. 4 is a flowchart of the steps of a maintenance method according to an embodiment of the present disclosure.

FIG. 4 is a flowchart of the steps of a maintenance method according to an embodiment of the present disclosure.

In step S101, it is determined whether to perform maintenance. When maintenance is to be performed (YES in S101), in step S102, the liquid discharge heads are each moved to a maintenance position.

The controller 100 determines whether to perform maintenance, for example. The maintenance may be performed at a predetermined time, or may be performed based on, for example, the status of a print job. The maintenance may be performed when a prescribed length of time has elapsed since the end of the printing step.

After the liquid discharge heads are each moved to the maintenance position, in step S103, ink is discharged into the liquid receiver. Subsequently, in step S104, pretreatment liquid is discharged into the liquid receiver. In the present example, the maintenance is completed by the discharge of the pretreatment liquid into the liquid receiver.

In the example of the illustrated flow, the flushing or dummy discharge is performed as maintenance. The flushing or dummy discharge of the present example corresponds to steps S102 to S104 in the flowchart.

Examples of the maintenance position include a position where the liquid receiver is provided. The position where the liquid receiver is provided can be appropriately selected. Some embodiments of the present disclosure are described below with reference to FIG. 2 and FIG. 3.

In the present embodiment described with reference to FIG. 2, the carriage 1 performs two-way scanning such that in a case where a direction of the two-way scanning is defined as a main scanning direction, and a direction orthogonal to the main scanning direction is defined as a sub-scanning direction, a print medium is conveyed in the sub-scanning direction, and in a case where an area where the first liquid discharge head discharges the ink onto the print medium is defined as a printing area, the liquid receiver includes: the first liquid receiver 21 disposed on one outer area of the printing area in the main scanning direction; and the second liquid receiver 22 disposed on another outer area of the printing area in the main scanning direction.

Since the liquid receiver is disposed on the outer area of the printing area ("a" in the drawing) in the main scanning direction, discharge is not hindered during the printing step. As described above, the first liquid receiver 21 and the second liquid receiver 22 are provided. As a result, for example, the use of the first liquid receiver 21 and the second liquid receiver 22 can be changed, and in addition, maintenance can be easily performed. Thus, the discharging characteristics of the ink and the pretreatment liquid can be more favorably maintained. The number of liquid receivers may be one, but it is desired that a pair of liquid receivers be arranged as in the present embodiment.

In the present embodiment described with reference to FIG. 2, since the maintenance position is common to the ink and the pretreatment liquid, the apparatus can be downsized. Since flushing or dummy discharge of the pretreatment liquid and flushing or dummy discharge of the ink are performed at the common position, control of the maintenance can be prevented from becoming complicated.

In a similar manner to the above, in the present embodiment described with reference to FIG. 3, a liquid receiver for ink is arranged at a prescribed outer area of the printing area in the main scanning direction. In the present embodiment described with reference to FIG. 3, a liquid receiver for pretreatment liquid is arranged at a prescribed outer area of the pretreatment area as will be described later in the main scanning direction.

In the present embodiment described with reference to FIG. 3, the first carriage 31 on which the first liquid discharge head is mounted and the second carriage 32 on which the second liquid discharge head is mounted perform two-way scanning in the same direction, and in a case where the direction of the two-way scanning is defined as a main scanning direction, and a direction orthogonal to the main scanning direction is defined as a sub-scanning direction, the print medium is conveyed in the sub-scanning direction. The liquid receiver includes an ink receiver that receives the discharge of ink and a pretreatment liquid receiver that receives flushing or dummy discharge of pretreatment liquid. In a case where an area where the first liquid discharge head discharges the ink onto the print medium is defined as a printing area, the ink receiver includes: a first ink receiver 41 disposed on one outer area of the printing area in the main scanning direction; and a second ink receiver 42 disposed on another outer area of the printing area in the main scanning direction. In a case where an area where the second liquid discharge head discharges the pretreatment liquid onto the print medium is defined as a pretreatment area, the pretreatment liquid receiver includes: a first pretreatment liquid receiver 43 disposed on one outer area of the pretreatment area in the main scanning direction; and a second pretreatment liquid receiver 44 disposed on another outer area of the pretreatment area in the main scanning direction.

Effects similar to the effects in the present embodiment described with reference to FIG. 2 can also be obtained in the present embodiment described with reference to FIG. 3. Since the liquid receivers are disposed on the outer sides with respect to the printing area ("a" in the drawing) and the pretreatment area ("b" in the drawing) in the main scanning direction, discharge is not hindered during the printing step. Each one of the liquid receiver for ink and the liquid receiver for pretreatment liquid includes a pair of liquid receivers. As a result, for example, the use of the two liquid receivers of each of the liquid receiver for ink and the liquid receiver for pretreatment liquid can be changed, and maintenance can be easily performed. Thus, the discharging characteristics of the ink and the pretreatment liquid can be more favorably maintained.

In the present embodiment described with reference to FIG. 3, since a maintenance position for the ink and a maintenance position for the pretreatment liquid are different, the influence of flushing or dummy discharge of the pretreatment liquid on flushing or dummy discharge of the ink is reduced as compared with the present embodiment described with reference to FIG. 2. However, when the pretreatment liquid is discharged, mist flies into the apparatus. This affects the flushing or dummy discharge of the ink. In order to handle such a situation, also in the present embodiment described with reference to FIG. 3, pretreatment liquid is discharged into the liquid receiver after the ink is discharged into the liquid receiver.

In the present embodiment described with reference to FIG. 3, the first liquid discharge head that discharges ink and the second liquid discharge head that discharges pretreatment liquid are mounted on a different carriage. For this reason, it is more difficult to downsize the apparatus in the present embodiment described with reference to FIG. 3 than in the present embodiment described with reference to FIG. 2. However, in the present embodiment described with reference to FIG. 3, it is possible to reduce the influence of the discharge of the pretreatment liquid on the nozzles for discharging the ink during the printing step. The separate carriage creates a time lag between the discharge of the pretreatment liquid onto the print medium and the discharge of the ink onto the print medium. Since the mist of the pretreatment liquid falls freely during this time period, the influence on the nozzles for discharging the ink can be reduced.

A supplementary description will be provided for the flushing or dummy discharge in the present embodiment described with reference to FIG. 3. In the flushing or dummy discharge according to the present embodiment, flushing or dummy discharge of the pretreatment liquid is to be performed after flushing the ink, and for example, the timing of moving the carriage can be changed as desired. For example, the first carriage 31 may move to the maintenance position to perform flushing or dummy discharge of the ink after the second carriage 32 moves to the maintenance position to perform flushing or dummy discharge of the pretreatment liquid. Alternatively, after both the first carriage 31 and the second carriage 32 move to the respective maintenance positions, flushing or dummy discharge of the pretreatment liquid may be performed, and then flushing or dummy discharge of the ink may be performed.

The configuration of the liquid receiver can be appropriately selected. The liquid receiver receives the discharge of the pretreatment liquid and the ink in a state where, for example, the liquid receiver is not in contact with the nozzles. As the liquid receiver does not contact the nozzles, the pretreatment liquid or the ink that is adhered to the liquid receiver can be prevented from adhering to the nozzles. The liquid receiver may include an absorbing member on a surface on which the pretreatment liquid and the ink are discharged.

When multiple types of ink are discharged in the flushing or dummy discharge, it is desired that the pretreatment liquid be discharged into the liquid receiver after discharging all the types of ink into the liquid receiver. This further prevents the influence of flushing or dummy discharge of the pretreatment liquid on the flushing or dummy discharge of the ink.

The liquid receiver may be coupled to a waste liquid tube, and the waste liquid tube may be coupled to a waste liquid bottle. In this case, liquid discharged into the liquid receiver is stored in the waste liquid bottle via the waste liquid tube. This allows the liquid receiver to be used for a long period of time.

The printing step is a step of discharging pretreatment liquid and ink onto a print medium to form an image on the print medium. The printing process is a process of discharging pretreatment liquid and ink onto a print medium to form an image on the print medium. The image is not limited to a visualized meaningful image such as a letter or a figure, and includes a meaningless pattern and a three-dimensional image. Printing may be referred to as, for example, image formation, recording, printing, image printing, and fabricating.

In the printing step, the pretreatment liquid is discharged onto the print medium, and then the ink is discharged onto the print medium. For example, drying is performed as necessary, and the print medium on which an image has been formed is conveyed and output. Steps such as drying may be included in the printing step, but need not be included in the printing step.

Examples of a method for reducing the influence of discharge of the pretreatment liquid on the nozzles for discharging the ink during the printing step include the following methods. For example, there is a method in which a discharger such as a fan is provided in the apparatus, and the fan is activated during the printing step so that mist of the pretreatment liquid is discharged by an airflow generated by the fan. In addition, a method for controlling the timing of discharging ink can also be cited as an example. In this method, the ink is discharged after a prescribed length of time has elapsed after the discharge of the pretreatment liquid. As a result, the ink can be discharged after the mist generated at the time of discharge of the pretreatment liquid falls freely.

By way of example, aspects of the present disclosure are given below.

First Aspect

A maintenance method to be performed by a liquid discharge apparatus including a first liquid discharge head to discharge ink, a second liquid discharge head to discharge pretreatment liquid, and a liquid receiver into which the ink and the pretreatment liquid are discharged, the maintenance method including flushing or dummy discharge to discharge the ink and the pretreatment liquid into the liquid receiver, the flushing or dummy discharge including discharging the ink into the liquid receiver and then discharging the pretreatment liquid into the liquid receiver.

Second Aspect

In the maintenance method according to the first aspect, the liquid discharge apparatus has a carriage including the first liquid discharge head and the second liquid discharge head, and the flushing or dummy discharge includes discharging the ink and discharging the pretreatment liquid after moving the carriage to the liquid receiver.

Third Aspect

In the maintenance method according to the first aspect, the liquid discharge apparatus includes: a first carriage having the first liquid discharge head; and a second carriage having the second liquid discharge head, the liquid receiver includes: an ink receiver into which the ink is discharged; and a pretreatment liquid receiver into which the pretreatment liquid is discharged, and the flushing or dummy discharge includes discharging the pretreatment liquid into the pretreatment liquid receiver after discharging the ink into the ink receiver.

Fourth Aspect

In the maintenance method according to any one of the first to third aspects, in a case that the ink includes a plurality of kinds of ink, the flushing or dummy discharge includes discharging all the kinds of ink into the liquid receiver and then discharging the pretreatment liquid into the liquid receiver.

Fifth Aspect

A liquid discharge apparatus includes: a first liquid discharge head to discharge ink; a second liquid discharge head to discharge pretreatment liquid; a liquid receiver into which the ink and the pretreatment liquid are discharged; and a controller to control the first liquid discharge head and the second liquid discharge head to discharge the pretreatment liquid onto a print medium and then discharge the ink onto the print medium, the controller controlling the first liquid discharge head and the second liquid discharge head to discharge the ink into the liquid receiver and then discharge the pretreatment liquid into the liquid receiver.

Sixth Aspect

The liquid discharge apparatus according to the fifth aspect further includes a carriage including the first liquid discharge head and the second liquid discharge head.

Seventh Aspect

In the liquid discharge apparatus according to the sixth aspect, the carriage performs two-way scanning in a main scanning direction, the print medium is conveyed in a sub-scanning direction orthogonal to the main scanning direction, the first liquid discharge head discharges the ink onto a printing area of the print medium, and the liquid receiver includes: a first liquid receiver disposed on one outer area of the printing area in the main scanning direction, and a second liquid receiver disposed on another outer area of the printing area in the main scanning direction.

Eighth Aspect

The liquid discharge apparatus according to claim 5 further includes: a first carriage having the first liquid discharge head; and a second carriage having the second liquid discharge head, and the second carriage performs two-way scanning in an area upstream from the first carriage in a conveyance direction of the print medium.

Ninth Aspect

In the liquid discharge apparatus according to the eighth aspect, the first carriage and the second carriage perform two-way scanning in a main scanning direction, the print medium is conveyed in a sub-scanning direction orthogonal to the main scanning direction, the liquid receiver includes: an ink receiver into which the ink is discharged; and a pretreatment liquid receiver to receive flushing or dummy discharge of the pretreatment liquid, the first liquid discharge head discharges the ink onto a printing area of the print medium, the ink receiver includes: a first ink receiver disposed on one outer area of the printing area in the main scanning direction; and a second ink receiver disposed on another outer area of the printing area in the main scanning direction, the second liquid discharge head discharges the pretreatment liquid onto a pretreatment area of the print medium, and the pretreatment liquid receiver includes: a first pretreatment liquid receiver disposed on one outer area of the pretreatment area in the main scanning direction; and a second pretreatment liquid receiver disposed on another outer area of the pretreatment area in the main scanning direction.

Tenth Aspect

In the liquid discharge apparatus according to any one of the fifth to ninth aspects, the print medium includes fabric.

Eleventh Aspect

In the liquid discharge apparatus according to any one of the fifth to tenth aspects, the pretreatment liquid contains water, an organic solvent, and a coagulant.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A maintenance method to be performed by a liquid discharge apparatus including a first liquid discharge head to discharge ink, a second liquid discharge head to discharge pretreatment liquid, and a liquid receiver into which the ink and the pretreatment liquid are discharged, the maintenance method comprising flushing the ink and the pretreatment liquid into the liquid receiver, the flushing including discharging the ink into the liquid receiver and then discharging the pretreatment liquid into the liquid receiver, wherein the liquid discharge apparatus further includes:

a first carriage having the first liquid discharge head; and a second carriage having the second liquid discharge head, the method further comprising:

performing, by the second carriage, two-way scanning in an area upstream from the first carriage in a conveyance direction of a print medium;

performing, by the first carriage and the second carriage, two-way scanning in a main scanning direction;

conveying the print medium in a sub-scanning direction orthogonal to the main scanning direction;

discharging the ink into an ink receiver of the liquid receiver;

receiving flushing of the pretreatment liquid by a pretreatment liquid receiver;

discharging, by the first liquid discharge head, the ink onto a printing area of the print medium;

wherein the ink receiver includes:

a first ink receiver disposed on one outer area of the printing area in the main scanning direction; and a second ink receiver disposed on another outer area of the printing area in the main scanning direction, wherein the method further comprises:

discharging, by the second liquid discharge head, the pretreatment liquid onto a pretreatment area of the print medium, wherein the pretreatment liquid receiver includes:

a first pretreatment liquid receiver disposed on one outer area of the pretreatment area in the main scanning direction; and a second pretreatment liquid receiver disposed on another outer area of the pretreatment area in the main scanning direction.

2. The maintenance method according to claim 1, wherein:

the flushing includes discharging the ink and discharging the pretreatment liquid after moving a carriage including the first liquid discharge head and the second liquid discharge head to the liquid receiver.

3. The maintenance method according to claim 1, wherein:

the flushing includes discharging the pretreatment liquid into a pretreatment liquid receiver of the liquid receiver after discharging the ink into an ink receiver of the liquid receiver.

4. The maintenance method according to claim 1, wherein:

in a case that the ink includes a plurality of kinds of ink, the flushing includes discharging all the kinds of ink into the liquid receiver and then discharging the pretreatment liquid into the liquid receiver.

5. The maintenance method according to claim 1, wherein:

the print medium includes fabric.

6. The maintenance method according to claim 1, wherein:

the pretreatment liquid contains water, an organic solvent, and a coagulant.

7. A liquid discharge apparatus comprising:

a first liquid discharge head to discharge ink;

a second liquid discharge head to discharge pretreatment liquid;

a liquid receiver into which the ink and the pretreatment liquid are discharged; and a controller to control the first liquid discharge head and the second liquid discharge head to discharge the pretreatment liquid onto a print medium and then discharge the ink onto the print medium, the controller controlling the first liquid discharge head and the second liquid discharge head to discharge the ink into the liquid receiver and then discharge the pretreatment liquid into the liquid receiver;

a first carriage having the first liquid discharge head; and a second carriage having the second liquid discharge head, wherein the second carriage performs two-way scanning in an area upstream from the first carriage in a conveyance direction of the print medium, wherein the first carriage and the second carriage perform two-way scanning in a main scanning direction, wherein the print medium is conveyed in a sub-scanning direction orthogonal to the main scanning direction, wherein the liquid receiver includes:

an ink receiver into which the ink is discharged; and a pretreatment liquid receiver to receive flushing of the pretreatment liquid, wherein the first liquid discharge head discharges the ink onto a printing area of the print medium, wherein the ink receiver includes:

a first ink receiver disposed on one outer area of the printing area in the main scanning direction; and a second ink receiver disposed on another outer area of the printing area in the main scanning direction, wherein the second liquid discharge head discharges the pretreatment liquid onto a pretreatment area of the print medium, and wherein the pretreatment liquid receiver includes:

a first pretreatment liquid receiver disposed on one outer area of the pretreatment area in the main scanning direction; and a second pretreatment liquid receiver disposed on another outer area of the pretreatment area in the main scanning direction.

8. The liquid discharge apparatus according to claim 7, wherein:

the print medium is conveyed in a sub-scanning direction orthogonal to the main scanning direction, the first liquid discharge head discharges the ink onto a printing area of the print medium, and the liquid receiver includes:

a first liquid receiver disposed on one outer area of the printing area in the main scanning direction; and a second liquid receiver disposed on another outer area of the printing area in the main scanning direction.

9. The liquid discharge apparatus according to claim 7, wherein:

the print medium includes fabric.

10. The liquid discharge apparatus according to claim 7, wherein:

the pretreatment liquid contains water, an organic solvent, and a coagulant.

* * * * *